United States Patent [19]

Beckner

[11] Patent Number: 5,449,254
[45] Date of Patent: Sep. 12, 1995

[54] COMPOST AERATION TOOL

[76] Inventor: Ruth Beckner, 15 Portola Ave., San Rafael, Calif. 94903

[21] Appl. No.: 384,473

[22] Filed: Jan. 31, 1995

Related U.S. Application Data

[62] Division of Ser. No. 131,215, Oct. 1, 1993, abandoned.

[51] Int. Cl.[6] .............................................. B23B 35/00
[52] U.S. Cl. ................................. 408/1 R; 172/1; 172/371; 408/227
[58] Field of Search .................. 175/18, 323, 394; 408/1 R, 199, 210, 227, 228, 230; 172/1, 371; 37/189, 195

[56] References Cited

U.S. PATENT DOCUMENTS

| 195,356 | 9/1877 | Fisher | 175/394 |
|---|---|---|---|
| 2,028,483 | 1/1936 | Van Yahres | 175/394 |
| 2,352,326 | 6/1944 | Kandle | 175/394 |
| 3,356,168 | 4/1965 | Johnson | 175/394 |
| 3,444,940 | 8/1967 | Thomas et al. | 175/394 |
| 4,185,707 | 1/1980 | Wilson | 175/394 |
| 4,282,943 | 8/1981 | Leitner | 175/394 |
| 4,807,710 | 2/1989 | Greeley | 175/394 |
| 4,906,146 | 3/1990 | Bowling | 408/228 |

FOREIGN PATENT DOCUMENTS

| 317875 | 9/1902 | France | 175/394 |
|---|---|---|---|
| 630090 | 11/1927 | France | 408/101 |
| 2331373 | 1/1975 | Germany | 408/230 |
| 189067 | 5/1937 | Switzerland | 175/394 |
| 3970 | of 1907 | United Kingdom | 175/394 |
| 1806478 | 4/1993 | U.S.S.R. | 172/371 |

OTHER PUBLICATIONS

Walt Nicke's Garden Talk 1993 Summer End Sale Catalog. p. 5, Compost Aerator. Order Blank.
Mellingers 1994 Home Farm and Garden Catalog. p. 103, E.Z. Turn Heavy Duty Compost Tool. Order Blank.
Classifieds from Organic Gardening Magazine, Mar. 1993. p. 116. Easy Compost Turning.
Burpee Gardens 1994, Catalog Cover. p. 139 E-Z Turn Compost tool. Burpee Order Blank.

*Primary Examiner*—Daniel W. Howell
*Attorney, Agent, or Firm*—David Pressman

[57] ABSTRACT

A cylindrical bit is made from an elongated shaft with a spiral blunt pointed cutting element secured to one end by welding or molding. The upper end of the shaft is held in the chuck of a hand-held drill. The drill, battery or mains powered, rotates the shaft. The rotating shaft is repeatedly plunged into the compost mixture to add air and air holes to improve biological decomposition and conversion of organic material into a humus-like mixture (compost).

12 Claims, 3 Drawing Sheets

COMPOST AERATION TOOL

Background—Gross-Reference To Related Application

This is a division of application Ser. No. 08/131,215, filed 1993-10-01, now abandoned.

BACKGROUND—FIELD OF INVENTION

This invention relates to composting, particularly to a tool for aerating compost.

BACKGROUND—PRIOR ART

Composting is the controlled biological decomposition and conversion of solid organic vegetable material, e.g., leaves and garbage, to a humus-like mixture of decaying organic matter (compost). It is desirable to make compost since it recycles waste materials and can be used to improve soil structure and provide it with nutrients. The process is aerobic, i.e., it takes place in oxygen. The process uses various microorganisms (mostly bacteria and fungi) to break down complex organic compounds into simpler substances.

Composting is a natural process which is accelerated by providing and maintaining the optimum environments, i.e., correct particle size, temperature, moisture, and oxygen. This creates an environment where the normal bacteria found in waste will convert the material to compost.

When properly applied to the soil, compost improves soil structure, by aerating the soil, increasing its water-holding capacity, making it more permeable, aiding in erosion control, and promoting soil fertility. Compost also helps solve the problems of waste management and overflowing garbage landfills by recycling garbage. To some degree, composting occurs in the backyard of every home in the world.

It is known that composting can be improved by aerating the mixture. Aeration is necessary for the biological action of microorganisms on organic waste material to break it into such a state that it can be readily used as compost, i.e., for the bacteria, fungi, and other microorganisms to increase and multiply.

Aeration presents a problem to anyone making compost, either in the back yard or at commercial recycling plants. Heretofore most compost aeration was done manually, i.e., by turning over the compost with a shovel, spade, pick, pitchfork, hoe, or the like. Such a process was laborious, time-consuming, and unpleasant.

Hand-operated tools have been used, but they usually prove quite unsatisfactory, because of the intense muscle strain and exhausting manual labor required to such devices.

U.S. Pat. No. 3,356,168, issued 1967 Dec. 5 to W. H. Johnson, titled "Garden and Lawn Augur" shows an auger with a helicoidal member on an 18″ long shaft. This tool is designed to bore a hole in the ground or lawn so as to be able to provide water, air, fertilizer, and the like below ground. However Johnson does not teach that his tool can be used to aerate organic matter or compost and would not be suitable for such a purpose since its long helicoidal member could not be used rapidly and easily in compost.

Objects And Advantages

Therefore one object of this invention is to provide a tool for the aeration of solid-organic material to speed up its biological decomposition and conversion. Another object is to provide a compost tool to help to solve the problems of waste disposal, today and in the future. A further object is to provide such a tool which can make holes in material being composted so air can freely flow into the material and so the bacteria fungus and microorganisms will more readily increase and multiply. Such a tool is easy to use, requires minimal manual labor, and is inexpensive to manufacture. It leaves holes for air to flow freely through decomposable matter. A yet further object is to provide such a tool and method of use which can aerate compost rapidly, easily, pleasantly, and thoroughly by virtually anyone without much manual labor or effort. These and other objects and advantages will be apparent upon considering the following detailed description.

SUMMARY

The present compost aerating tool is a sturdy cylindrical shaft, or bit, ending with a short spiral blunt pointed cutting element secured by welding, molding, or forging. The other end of shaft can be held in the chuck of a cordless drill or other rotary power source. The tool is long lasting and fast in operation and easily and swiftly penetrates the cellulose material of organic waste used for making compost so as to provide openings and entrances for the inclusion and cross circulation of air.

Reference Numerals

1. Compost tool
2. Drill
3. Shaft
4. Spiral Pointed Blunt Cutting Element
5. Drill Chuck
6. Trigger Switch
7. Blunt Point
8. Proximal End Of 3
9. Spiral
10. Leading Edge Portion of Fin
11. Trailing Edge Portion of Fin
12. Edge of Hole
13. Weld
14. Compostable Material
15. Hole
16. Distal End of Shaft 3
17. Air

DRAWINGS

DETAILED DESCRIPTION OF THE PREFERRED EMBODIMENT

Figure 1:
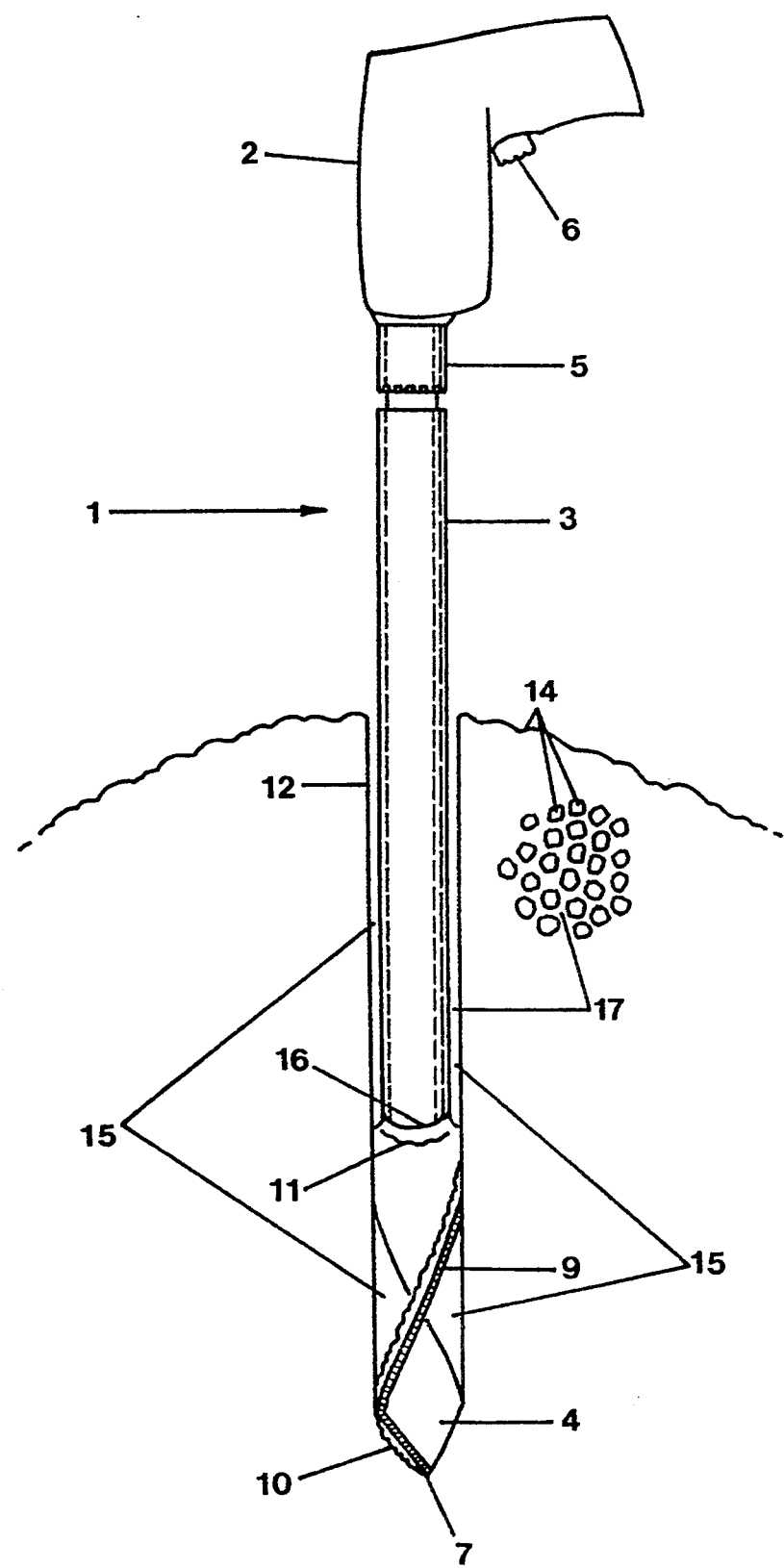
FIG. 1 is a perspective view of the preferred embodiment of a compost aeration tool according to the present invention and in use with a hand-held power drill.

FIG. 1 shows a compost aeration tool or bit 1 of the invention. It is driven by a power drill 2 of conventional construction, for example a portable (i.e., hand held) battery-powered drill. Tool 1 has a shaft 3 with a diameter of ⅜ inch so as to fit into a chuck 5 of a standard ⅜″ hand drill 2. Shaft 3 has a spiral pointed cutting element 4 (FIGS. 1 to 4) at distal end 16 to drill holes in a rapid and efficient manner into compostable cellulose material 14. Shaft 3 has a length of 30" to 36" to permit the user to comfortably handle tool 1 and drill 2 to drill air holes from any angle into material 14.

The user activates drill 2 by turning on switch 6, causing shaft 3 to rotate so that it can drill hole 15 into organic matter 14. The user need apply only light pressure to quickly drill hole 15 to any depth. During drilling, blunt point 7 of element 4 pushes aside and deflects such matter 14 to make hole 15 in an average time of less than a second.

Tool 1 then is quickly withdrawn from hole 15. Hole 15, is filled by fresh air 17. The air accelerates microbial activity and thus the decomposition of material 14.

Tool 1 can be thrust into the material 14 from any angle, horizontal, vertical, or diagonal.

Figure 4:
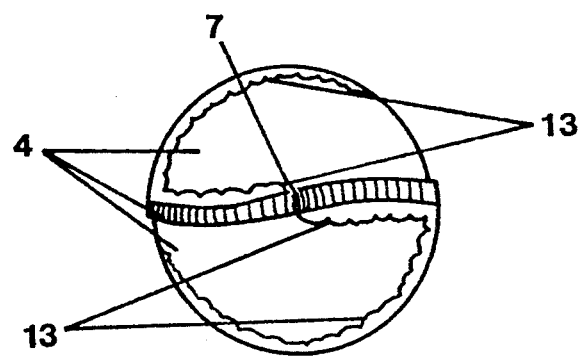
FIG. 4 is a bottom view showing a weld of a element of the bit.

FIG. 4 has a leading blunt point 7. To minimize undesirable eccentric orbital motion, point 7 may first be rested on compostable material 14 before activation of drill 2.

Figure 2:
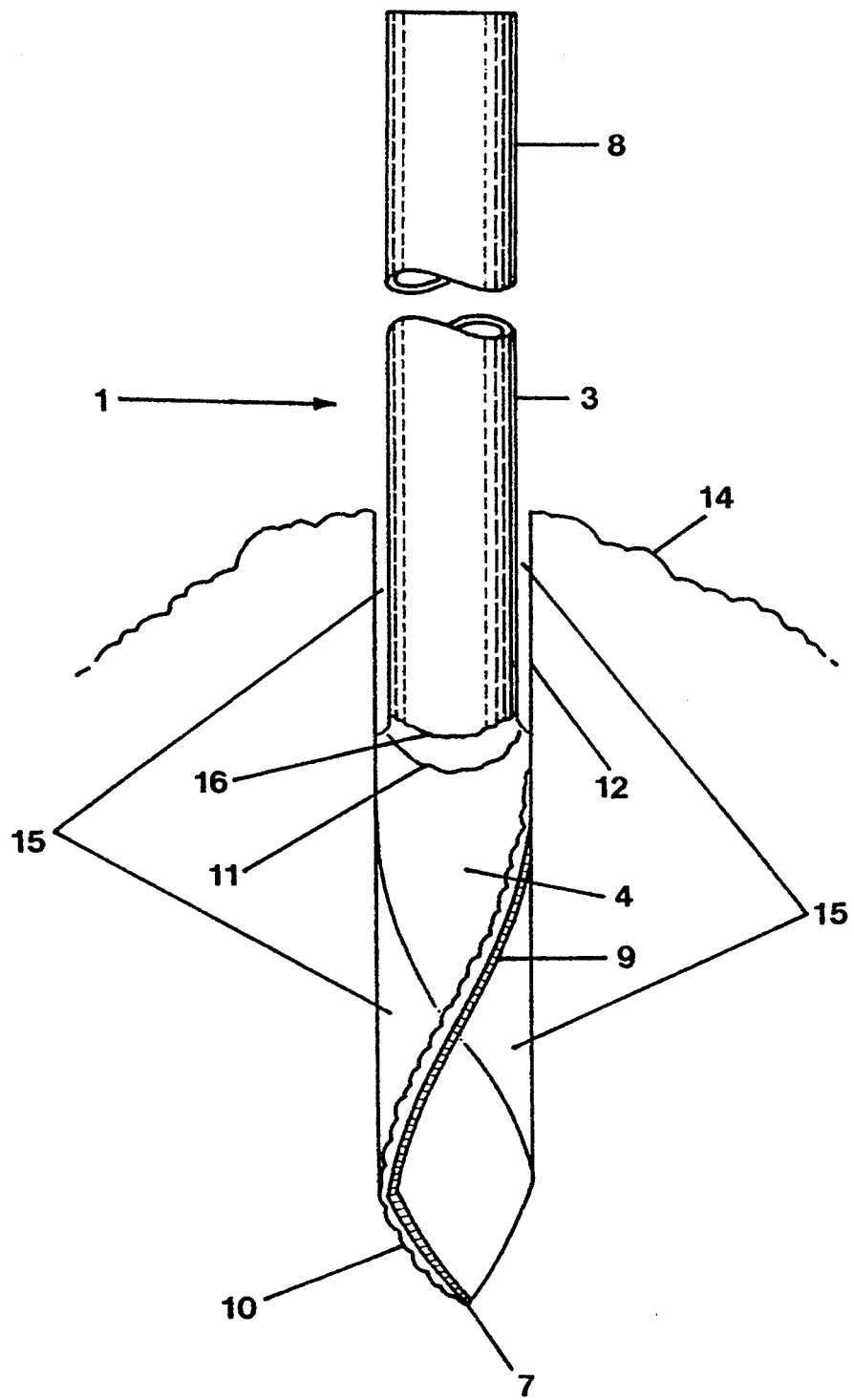
FIG. 2 is a view of a bit of the tool of FIG. 1 forming a hole in organic matter.

FIG. 2 shows an enlarged view of tool I with shaft 3 and element 4. These parts may be integrally made or molded of metal, steel, plastics, or resins. The outer diameter of proximal end 8 of shaft 3 is cylindrical and of the same size as the rest of shaft 3.

Element 4 has a right-handed spiral 9 to compliment common right-handed power drills. Spiral 9 makes a 180° revolution (one-half turn to right). As can be seen in FIGS. 1 and 2, the spiral has two opposing major surfaces, a substantially uniform thickness between these surfaces, and undergoes a twist such that both of its opposing surfaces can be seen from any one direction perpendicular to the shaft.

As shown in FIGS. 1 and 2, element 4 has a leading edge 10 and a trailing edge 11. Edge 11 is slightly wider than distal end 16 of shaft 3. Edge 10 terminates in a rounded blunted point 7 so as to prevent accidental cuts and the catching of loose clothing.

Shaft 3 and element 4 may be formed of the same or different materials, which should be rigid and durable. Shaft 3 and element 4 may be constructed of separate parts or integrally welded or molded in a manner known to those skilled in the art. I thus provide a tool of relatively simple construction, which can be readily manufactured.

Figure 3:
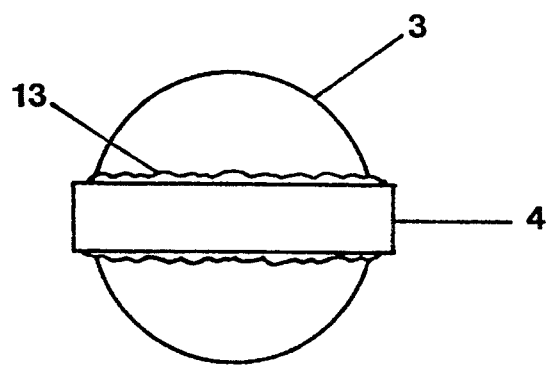
FIG. 3 is an enlarged view showing the bottom end of the tool.

FIG. 3 is a cross-section enlarged diagrammatic bottom view of tool 1 and show the bottom edge construction of the tool with welded or molded end of element 4. FIG. 4 is a cross-sectional bottom view showing a weld 13 which attaches element 4 to shaft 3 at distal end 16 of shaft 3.

Ramifications and Scope

The foregoing description and the accompanying drawings provide examples and illustrations. Those skilled in the art will be readily able to make changes in the forms of the parts, substitute equivalent elements, and rearrange the parts, all within the scope of the invention. Accordingly the reader should determine the scope of the invention by the appended claims and their legal equivalents, and not by the examples given.

Having thus described the invention, what is claimed and desired to be secured by Letters Patent is:

1. A method of aerating a pile of compostable material, comprising:
providing a pile of organic compostable material,
providing a tool comprising an elongated rigid shaft having distal and proximal ends and a center portion between said distal and proximal ends, said distal end comprising a pointed tip having a pair of diverging leading edges extending proximally from said tip and a pair of proximal ends, and a spiral portion extending proximally from said pair of proximal ends of said leading edges, said center portion of said shaft having a diameter not greater than said distal end of said shaft, and a motorized rotary driver connected to said proximal end of said shaft for rotating said shaft, said motorized rotary driver including means for selectively starting and stopping said shaft, and means for enabling a human operator to hold said motorized rotary driver,
starting said motorized rotary driver so as to cause said shaft to rotate, and
repeatedly plunging said elongated rigid shaft, pointed tip first and while it is rotating, into said pile of compostable material at a plurality of locations on said pile and in a plurality of different directions so as to form a plurality of holes which extend into said pile from outside said pile, thereby to permit plural channels of air to enter said pile so as to enable and accelerate the decomposition of said pile.

2. The compost aeration tool of claim 1 wherein said tool is provided so that said shaft has a diameter of about ⅜ inch, is made of hardened steel, and is about 36 inches long.

3. The compost aeration tool of claim 1 wherein said spiral portion of said shaft is provided with a blade having a thickness of ¼ inch and a width of ⅜ inch.

4. The compost aeration tool of claim 3 wherein said spiral portion of said shaft is provided to be about 2 inches long and with about a 180° curve.

5. The compost aeration tool of claim 4 wherein said shaft has a diameter of about ⅜ inch, is made of hardened steel, and is about 36 inches long.

6. The compost aeration tool of claim 1 wherein said tool is provided so that said spiral portion of said shaft extends proximally from said proximal ends of said leading edges with two opposing major surfaces, a substantially uniform thickness between said surfaces, and undergoes a twist such that both of said surfaces can be seen from any one direction perpendicular to said elongated rigid shaft.

7. A method of aerating a pile of compostable material, comprising:
providing a pile of organic compostable material,
providing a tool comprising an elongated rigid shaft having distal and proximal ends and a center portion between said distal and proximal ends, said distal end comprising a pointed tip having a pair of diverging leading edges extending proximally from said tip and a pair of proximal ends, and a spiral portion extending proximally from said pair of proximal ends of said leading edges, said center portion of said shaft having a diameter not greater than said distal end of said shaft, and a motorized rotary driver connected to said proximal end of said shaft for rotating said shaft, said motorized rotary driver including a switch for selectively starting and stopping said shaft, and an area where a human operator can hold said motorized rotary driver,
starting said motorized rotary driver so as to cause said shaft to rotate, and repeatedly plunging said elongated rigid shaft, pointed tip first and while it is rotating, into said pile of compostable material at a plurality of locations on said pile and in a plurality of different directions so as to form a plurality of holes which extend into said pile from outside said pile, thereby to permit plural channels of air to enter said pile so as to enable and accelerate the decomposition of said pile.

8. The compost aeration tool of claim 7 wherein said tool is provided so that said shaft has a diameter of about ⅜ inch, is made of hardened steel, and is about 36 inches long.

9. The compost aeration tool of claim 7 wherein said spiral portion of said shaft is provided with a blade having a thickness of ¼ inch and a width of ⅜ inch.

10. The compost aeration tool of claim 9 wherein said spiral portion of said shaft is provided to be about 2 inches long and with about a 180° curve.

11. The compost aeration tool of claim 10 wherein said shaft has a diameter of about ⅜ inch, is made of hardened steel, and is about 36 inches long.

12. The compost aeration tool of claim 7 wherein said tool is provided so that said spiral portion of said shaft extends proximally from said proximal ends of said leading edges with two opposing major surfaces, a substantially uniform thickness between said surfaces, and undergoes a twist such that both of said surfaces can be seen from any one direction perpendicular to said elongated rigid shaft.

* * * * *